US009960699B2

(12) United States Patent
Hsieh et al.

(10) Patent No.: US 9,960,699 B2
(45) Date of Patent: May 1, 2018

(54) POWER SUPPLY SYSTEM WITH PLURAL PARALLEL MODULES AND LOOP CURRENT LIMITING

(71) Applicant: DELTA ELECTRONICS, INC., Taoyuan (TW)

(72) Inventors: Yi-Ping Hsieh, Taoyuan (TW); Hung-Chieh Lin, Taoyuan (TW); Chao-Lung Kuo, Taoyuan (TW); Jin-Zhong Huang, Taoyuan (TW); Po-Hsin Tseng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days. days.

(21) Appl. No.: 15/682,568

(22) Filed: Aug. 22, 2017

(65) Prior Publication Data

US 2018/0091062 A1 Mar. 29, 2018

(30) Foreign Application Priority Data

Sep. 29, 2016 (TW) ............................. 105131323 A

(51) Int. Cl.
*H02M 5/458* (2006.01)

(52) U.S. Cl.
CPC ................................ *H02M 5/4585* (2013.01)

(58) Field of Classification Search
CPC ............................ H02M 5/458; H02M 5/4585
(Continued)

(56) References Cited

U.S. PATENT DOCUMENTS 7,564,703 B1 * 7/2009 Braun .................. H02M 7/493 363/34
8,964,432 B2 * 2/2015 Tang ...................... H02M 7/48 363/71
(Continued)

FOREIGN PATENT DOCUMENTS

CN 201138785 Y 10/2008
CN 201754560 U 3/2011
(Continued)

OTHER PUBLICATIONS

Jong-Pil Lee, et al, "Analysis and Design of coupled inductor for Two-phase Interleaved DC-DC converters", JNL of power electronics, vol. 13,No. 3, May 2013, pp. 339-348.

*Primary Examiner* — Jeffrey Sterrett
(74) *Attorney, Agent, or Firm* — CKC & Partners Co., Ltd.

(57) ABSTRACT

A power converting device includes a first and a second power module electrically coupled in parallel, a loop current limiting circuit and a driving circuit. A first and a second terminal of the loop current limiting circuit are coupled to the first and the second power module respectively. A third and a fourth terminal of the loop current limiting circuit are coupled to each other. The loop current limiting circuit includes a coupled differential-mode inductor, a first inductive unit and a second inductive unit. A first winding and a second winding of the coupled differential-mode inductor are coupled to the first and the second power modules respectively. The first and the second inductive units are coupled to the first and the second power modules respectively. The driving circuit is configured to output a driving signal to the first and the second power module according to a current detecting signal.

20 Claims, 7 Drawing Sheets

(58) Field of Classification Search
USPC ............................ 363/34, 35, 37, 65, 69, 71
See application file for complete search history.

(56) References Cited

U.S. PATENT DOCUMENTS

| | | | | |
|---|---|---|---|---|
| 2004/0017689 | A1* | 1/2004 | Zhang | H02M 5/45 363/71 |
| 2009/0109713 | A1* | 4/2009 | Schnetzka | H02M 5/4585 363/34 |
| 2010/0165678 | A1* | 7/2010 | Costan | H02M 7/493 363/71 |
| 2011/0026281 | A1* | 2/2011 | Chapman | H02J 3/38 363/65 |
| 2014/0133201 | A1 | 5/2014 | Brandmeyer et al. | |
| 2015/0349662 | A1* | 12/2015 | Jiang | H02M 7/5395 363/71 |

FOREIGN PATENT DOCUMENTS

| | | | |
|---|---|---|---|
| CN | 102681980 | A | 9/2012 |
| CN | 101677220 | B | 1/2013 |
| CN | 104782023 | A | 7/2015 |
| CN | 105137197 | A | 12/2015 |
| CN | 204993064 | U | 1/2016 |
| TW | 360457 | U | 6/1999 |
| TW | 201312919 | A1 | 3/2013 |
| TW | 201611489 | A | 3/2016 |

* cited by examiner

POWER SUPPLY SYSTEM WITH PLURAL PARALLEL MODULES AND LOOP CURRENT LIMITING

RELATED APPLICATIONS

This application claims priority to Taiwan Application Serial Number 105131323, filed Sep. 29, 2016, which is herein incorporated by reference.

BACKGROUND

Technical Field

The present disclosure relates to a power supply system, and in particular, to a power supply system with multiple power modules coupled in parallel.

Description of Related Art

In recent times, with the increasing capacity requirement, the backup power supply system may increase the system capacity by coupling power modules in parallel, in order to increase the allowed transmission power accordingly.

However, due to the variance of the delay of the control signals, loop current easily occurs during the steady state between the parallel-coupled power modules, and the current may also change rapidly during the transient state, which may damage the system's elements in severe conditions. Therefore, an important area of research in the field involves methods and techniques of current equalization between the power modules.

SUMMARY

According to one aspect of the present disclosure, a power converting device is provided, including a first power module and a second power module, in which the first power module and the second power module are electrically coupled in parallel; a loop current limiting circuit, in which a first terminal and a second terminal of the loop current limiting circuit are coupled to the first power module and the second power module respectively, a third terminal and a fourth terminal of the loop current limiting circuit are coupled to each other, and the loop current limiting circuit includes: a coupled differential-mode inductor, including a first winding and a second winding, in which the first winding is electrically coupled to the first power module, and the second winding is electrically coupled to the second power module; a first inductive unit coupled to the first winding; and a second inductive unit coupled to the second winding; and a driving circuit configured to output a driving signal to the first power module and the second power module according to a current detecting signal.

According to another aspect of the present disclosure, a power supply system is provided, including a grid-side converting device configured to receive an input current from a grid and supply power to a dc bus; and a load-side converting device configured to receive power from the dc bus and output an output current and supply power to a load; in which the grid-side converting device includes: a first grid-side power module and a second grid-side power module, in which the first grid-side power module and the second grid-side power module are electrically coupled in parallel to the dc bus and configured to receive a first input current and a second input current from the grid; a grid-side loop current limiting circuit, in which a first terminal and a second terminal of the grid-side loop current limiting circuit are coupled to the first grid-side power module and the second grid-side power module respectively, a third terminal and a fourth terminal of the grid-side loop current limiting circuit are coupled to each other, and the grid-side loop current limiting circuit includes: a coupled differential-mode inductor, including a first winding and a second winding, in which the first winding is electrically coupled to the first grid-side power module, and the second winding is electrically coupled to the second grid-side power module; a first inductive unit coupled to the first winding; and a second inductive unit coupled to the second winding; and a grid-side driving circuit configured to output a grid-side driving signal to the first grid-side power module and the second grid-side power module according to a grid-side current detecting signal, to control the amplitude of the first input current and the second input current.

According to another aspect of the present disclosure, a control method is provided, including: outputting, by a driving circuit, a driving signal to a first power module and a second power module according to a current detecting signal, in which the first power module and the second power module are electrically coupled to each other in parallel; providing a loop current limiting circuit including a first inductive unit and a first winding of a coupled differential-mode inductor arranged in a first branch, the loop current limiting circuit further including a second inductive unit and a second winding of the coupled differential-mode inductor arranged in a second branch; controlling, by the first power module, a first current in the first branch according to the driving signal; controlling, by the second power module, a second current in the second branch according to the driving signal; and balancing, by the loop current limiting circuit, the first current and the second current.

DETAILED DESCRIPTION

Figure 1:
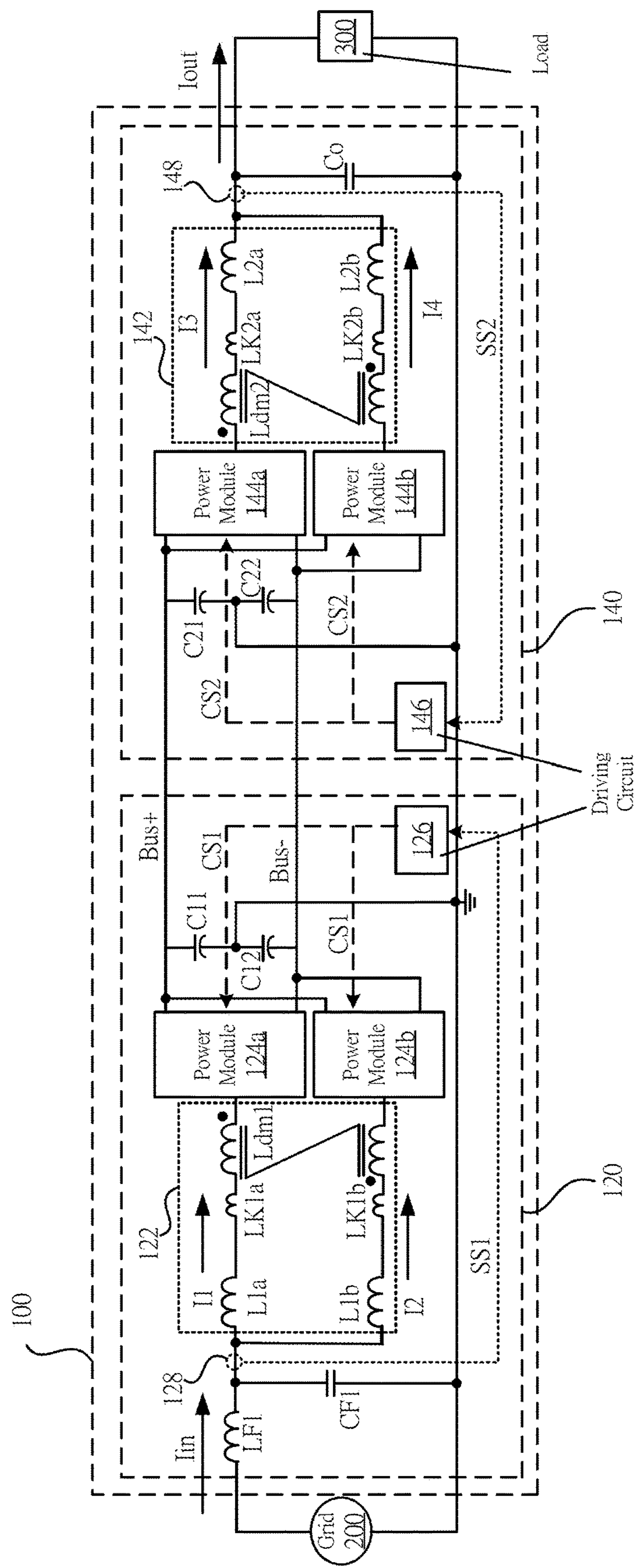
FIG. 1 is a diagram illustrating a backup power supply system according to some embodiments of the present disclosure.

The embodiments herein described are by examples, and are not intended to be limiting. Alternatives, modifications and equivalents may be included within the spirit and scope of the disclosure as defined by the appended claims. Drawings are not drawn to scale and not meant to limit the actual embodiments of the present disclosure. Wherever possible, same reference numbers are used in the drawings and the description to refer to the same or like parts. Specific operations of similar elements already discussed may be omitted for sake of brevity, unless there is a need to introduce co-operation relationship of the elements. While method steps are disclosed herein as a series of acts or events, some may occur in different orders and/or concurrently with other acts or events apart from those described herein. The term "coupled" and "connected" may be used to indicate that two or more elements cooperate or interact with each other, and may also be termed electrically coupled/ connected. The terms "first," "second," etc., are used to distinguish one element from another.

Reference is made to FIG. 1. As shown, a backup power supply system 100 includes a grid-side converting device 120 and a load-side converting device 140. The backup power supply system 100 is configured to receive an input current Iin from a grid 200, and correspondingly output an output current Iout to supply power to a load 300. The grid-side converting device 120 and the load-side converting device 140 are electrically coupled to each other via a dc bus positive terminal Bus+ and a dc bus negative terminal Bus−. Thus, the grid-side converting device 120 may receive the input current Iin from the grid 200 and supply power to the dc bus, and the load-side converting device 140 may receive power from the dc bus and output the output current Iout to supply power to the load 300. Energy may be stored in the energy storing elements such as capacitor units C11, C12 and capacitor units C12, C22 across the dc bus positive terminal Bus+ and the dc bus negative terminal Bus− in the backup power supply system 100. In some embodiments, the load-side converting device 140 may also output the output current Iout to the grid. When the load-side converting device 140 is electrically coupled to the grid and supplies power to the grid, the backup power system 100 may also perform as a backup power supply system having the active power filter (APF) ability.

As shown in FIG. 1, in some embodiments, the grid-side converting device 120 and the load-side converting device 140 may include multiple power modules (e.g., grid-side power modules 124*a*, 124*b* and load-side power modules 144*a*, 144*b*) electrically coupled in parallel, to meet particular capacity requirement of the backup power supply system 100. The grid-side converting device 120 and the load-side converting device 140 may include a grid-side loop current limiting circuit 122 and a load-side loop current limiting circuit 142, and may achieve current balancing and auto balance between the parallel coupled power modules, and may prevent the damage of circuit elements resulting from the loop current occurring between the parallel coupled power modules.

As shown in the figure, in some embodiments, the grid-side converting device 120 includes a filter inductor LF1, a filter capacitor CF1, the grid-side loop current limiting circuit 122, the grid-side power modules 124*a*, 124*b*, the grid-side driving circuit 126 and the current detecting unit 128.

The filter inductor LF1 and the filter capacitor CF1 are electrically coupled to the input terminal of the grid-side converting device 120. The filter inductor LF1 and the filter capacitor CF1 are electrically coupled to each other to form a filtering circuit configured to receive the input current Iin and perform filtering to the input current Iin.

The grid-side loop current limiting circuit 122 is electrically coupled to the filter inductor LF1 and the filter capacitor CF1. Specifically, the first terminal and the second terminal of the grid-side loop current limiting circuit 122 are electrically coupled to the grid-side power module 124*a* and the grid-side power module 124*b* respectively. The third terminal and the fourth terminal of the grid-side loop current limiting circuit 122 are coupled to each other, and configured to receive the filtered input current Iin.

As shown in FIG. 1, the grid-side loop current limiting circuit 122 includes a coupled differential-mode inductor Ldm1, an inductive unit L1*a*, and an inductive unit L1*b*. The coupled differential-mode inductor Ldm1 includes a first winding and a second winding coupled to each other. The first winding of the coupled differential-mode inductor Ldm1 is electrically coupled to the inductive unit L1*a* and arranged in a first branch, and configured to transmit to the grid-side power module 124*a* a current I1 after current division. The second winding of the coupled differential-mode inductor Ldm1 is electrically coupled to the inductive unit L1*b* and arranged in a second branch, and configured to transmit to the grid-side power module 124*b* a current I2 after current division. Thus, the input current Iin may be divided into the current I1 and the current I2, and transmitted to the grid-side power module 124*a* and the grid-side power module 124*b* respectively.

Accordingly, by the flux balance in the first winding and the second winding of the coupled differential-mode inductor Ldm1, an auto balance of the current I1 in the first branch and the current I2 in the second branch may be achieved during a steady state of the circuit.

A first terminal of the grid-side power module 124*a* and a first terminal of the grid-side power module 124*b* are electrically coupled to the dc bus positive terminal Bus+. A second terminal of the grid-side power module 124*a* and a second terminal of the grid-side power module 124*b* are electrically coupled to a dc bus negative terminal Bus−. A third terminal of the grid-side power module 124*a* is electrically coupled to the first winding of the coupled differential-mode inductor Ldm1. A third terminal of the grid-side power module 124*b* is electrically coupled to the second winding of the coupled differential-mode inductor Ldm1.

The grid-side driving circuit 126 is configured to output a grid-side driving signal CS1 to the grid-side power module 124*a* and the grid-side power module 124*b* according to a grid-side current detecting signal SS1. Alternatively stated, the grid-side power module 124*a* and the grid-side power module 124*b* are driven according to the same grid-side driving signal CS1.

When transmitting the grid-side driving signal CS1, a time delay for the grid-side driving signal CS1 transmitting to the grid-side power module 124*a*, 124*b* may be different. This may be, for example, due to differences in manufacturing process of the circuit elements. During steady state, loop current is occurring and there may be transient current variations when the grid-side power modules 124*a*, 124*b* are turned on. In the grid-side loop current limiting circuit 122, in addition to leakage inductance LK1*a*, LK1*b*, the first winding and the second winding of the coupled differential-mode inductor Ldm1 are further coupled in series to the inductive unit L1*a* and the inductive unit L1*b* respectively. The overall equivalence inductance is increased and further limits the loop current during steady state, and also limits the transient current variation caused due to time delay differences mentioned above when the grid-side power modules 124*a*, 124*b* are turned on. Thus, the grid-side power modules

124*a*. 124*b* may provide steady current to the capacitor units C11, C12 and supply power to the dc bus.

Specifically, in loop current limiting circuit of some embodiments, terminals of one side of coupled differential-mode inductor are directly coupled to each other and are used as a single connecting point. Further, a single inductor unit is coupled between the terminal of the coupled differential-mode inductor and the input/output terminal of the power module. The loop current limiting ability is determined based on the leakage inductance of the coupled magnetizing inductor. Since leakage inductance is determined by the number of turns of the coupled inductor, when the coupled magnetizing inductor is applied in the large current parallel-coupled circuit, smaller number of turns may result in small leakage inductance and worse loop current limiting ability.

On the other hand, in some embodiments, a single inductive unit is divided into inductive unit L1*a* and inductive unit L1*b*, each being arranged in different current branches and coupled in series to the windings in the coupled differential-mode inductor Ldm1, and thus the equivalence inductance in each current branch is increased. The inductive unit L1*a* and the inductive unit L1*b* are respectively independent to the leakage inductance LK1*a*, LK1*b* of the coupled differential-mode inductor Ldm1. Accordingly, the transient current variation and the loop current in the steady state between the power modules may be effectively limited. Furthermore, dividing a single inductive unit into two sets of the inductive units L1*a*, L1*b* may further improve the heat dissipation under large current and prevent the abnormal operation due to overheating of the circuits.

In some embodiments, the grid-side current detecting unit 128 may be configured to detect the input current Iin of the grid 200 and correspondingly output the grid-side current detecting signal SS1 to the grid-side driving circuit 126, such that the grid-side driving circuit 126 drives the grid-side power modules 124*a*, 124*b*. The input current Iin may be equal to the sum of the current I1 flowing through the first branch and the current I2 flowing through the second branch.

In some embodiments, the grid-side converting device 120 further includes capacitor units C11, C12. The first terminal of the capacitor unit C11 is electrically coupled to the dc bus positive terminal Bus+, and the second terminal of the capacitor unit C11 is electrically coupled to the neutral point (e.g. the system ground terminal) of the dc bus. The first terminal of the capacitor unit C12 is electrically coupled to the second terminal of the capacitor unit C11, and the second terminal of the capacitor unit C12 is electrically coupled to the dc bus negative terminal Bus−. Thus, the parallel coupled grid-side power modules 124*a*, 124*b* may store in the capacitor units C11, C12 the energy received from the grid 200.

The above described grid-side converting device 120 may prevent damage to the circuit elements from loop current occurring due to unbalanced current I1 and I2, and may transmit power through the multiple parallel-coupled grid-side power modules 124*a*, 124*b* to meet capacity requirement of the backup power supply system 100.

Referring to FIG. 1 and the load-side converting device 140, in some embodiments, the load-side converting device 140 includes an output capacitor Co, a load-side loop current limiting circuit 142, load-side power modules 144*a*, 144*b*, a load-side driving circuit 146 and a current detecting unit 148.

In some embodiments, the first terminal and the second terminal of the load-side loop current limiting circuit 142 are electrically coupled to the load-side power module 144*a* and the load-side power module 144*b* respectively. The third terminal and the fourth terminal of the load-side loop current limiting circuit 142 are electrically coupled to each other and further electrically coupled to the output capacitor Co, and configured to provide an output current Iout to provide power to the load 300.

The load-side loop current limiting circuit 142 includes a coupled differential-mode inductor Ldm2, an inductive unit L2*a*, and an inductive unit L2*b*. The coupled differential-mode inductor Ldm2 includes a first winding and a second winding coupled to each other. The first winding of the coupled differential-mode inductor Ldm2 is electrically coupled to the inductive unit L2*a* and arranged in the first branch, and configured to transmit to the load 300 a current I3 after current division from the load-side power module 144*a*. The second winding of the coupled differential-mode inductor Ldm2 is electrically coupled to the inductive unit L2*b* and arranged in the second branch, and configured to transmit to the load 300 a current I4 after current division from the load-side power module 144*b*. Thus, the current I3 and I4 may be transmitted from the load-side power module 144*a* and the load-side power module 144*b* respectively, and converges as the output current Iout at the output terminal of the load-side converting device 140, and supply power to the load 300.

By the flux balance in the first winding and the second winding of the coupled differential-mode inductor Ldm2, an auto balance of current I3 in the first branch and current I4 in the second branch may be achieved during steady state of the circuit.

A first terminal of the load-side power module 144*a* and a first terminal of the load-side power module 144*b* are electrically coupled to the dc bus positive terminal Bus+. A second terminal of the load-side power module 144*a* and a second terminal of the load-side power module 144*b* are electrically coupled to a dc bus negative terminal Bus−. A third terminal of the load-side power module 144*a* is electrically coupled to the first winding of the coupled differential-mode inductor Ldm2. A third terminal of the load-side power module 144*b* is electrically coupled to the second winding of the coupled differential-mode inductor Ldm2.

The load-side driving circuit 146 is configured to output a load-side driving signal CS2 to the load-side power module 144*a* and the load-side power module 144*b* according to a load-side current detecting signal SS2. Alternatively stated, the load-side power modules 144*a*, 144*b* are driven by the same load-side driving signal CS2.

In the load-side loop current limiting circuit 142, in addition to leakage inductance LK2*a*, LK2*b*, the first winding and the second winding of the coupled differential-mode inductor Ldm2 are further coupled in series to the inductive unit L2*a* and the inductive unit L2*b* respectively. The overall equivalence inductance is increased and further limits the loop current during steady state, and also limits the transient current variation caused due to time delay differences when the load-side power modules 144*a*, 144*b* are turned on. Thus, the load-side power modules 144*a*, 144*b* may provide steady current from the capacitor units C11, C12 and supply power to the load.

In some embodiments, the load-side current detecting unit 148 in the load-side converting device 140 may be configured to detect the output current Iout and correspondingly output the load-side current detecting signal SS2 to the load-side driving circuit 146, such that the load-side driving circuit 146 drives the load-side power modules 144*a*, 144*b*. The output current Iout may be equal to the sum of the current I3 flowing through the first branch and the current I4 flowing through the second branch. The grid-side current detecting unit 128 and the load-side current detecting unit 148 may be implemented by various Hall elements applying Hall Effect, or by other electronic elements or magnetic elements.

In some embodiments, the load-side converting device 140 includes capacitor units C21, C22. The first terminal of the capacitor unit C21 is electrically coupled to the dc bus positive terminal Bus+, and the second terminal of the capacitor unit C21 is electrically coupled to the neutral point (e.g., the system ground terminal) of the dc bus. The first terminal of the capacitor unit C22 is electrically coupled to the second terminal of the capacitor unit C21, and the second terminal of the capacitor unit C22 is electrically coupled to the dc bus negative terminal Bus−. Thus, accompanied with the capacitor units C21, C22, the parallel coupled load-side power modules 144*a*, 144*b* may output the power from the dc bus to the load 300.

The above described load-side converting device 140 may prevent damage to the circuit elements from loop current occurring due to unbalanced current I3 and I4, and may transmit power through the multiple parallel-coupled load-side power modules 144*a*, 144*b* to meet capacity requirement of the backup power supply system 100.

Figure 2:
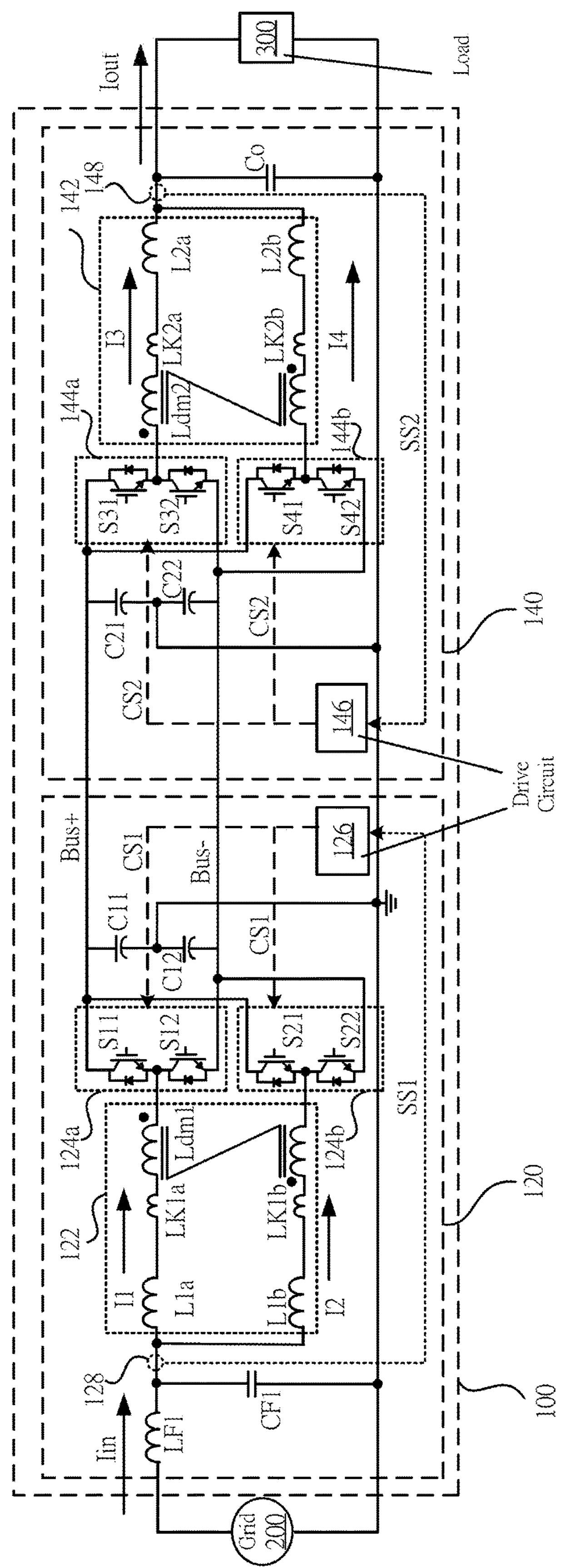
FIG. 2 is a diagram illustrating the backup power supply system according to some embodiments of the present disclosure.

Referring to FIG. 2, in some embodiments, the grid-side power module 124*a* includes a first power module first switch S11, a first power module second switch S12, and the grid-side power module 124*b* includes a second power module first switch S21, and a second power module second switch S22. The load-side power module 144*a* includes a power module first switch S31, a power module second switch S32, and the load-side power module 144*b* includes a power module first switch S41, and a power module second switch S42. A first terminal of the first power module first switch S11 is electrically coupled to a first terminal (i.e., the dc bus positive terminal Bus+) of the grid-side power module 124*a*. A second terminal of the first power module first switch S11 is electrically coupled to the third terminal of the grid-side power module 124*a*. A first terminal of the first power module second switch S12 is electrically coupled to the third terminal of the grid-side power module 124*a*. A second terminal of the first power module second switch S12 is electrically coupled to the second terminal (i.e., the dc bus negative terminal Bus−) of the grid-side power module 124*a*.

A first terminal of the second power module first switch S21 is electrically coupled to the first terminal (i.e., the dc bus positive terminal Bus+) of the grid-side power module 124*a*. A second terminal of the second power module first switch S21 is electrically coupled to the third terminal of the grid-side power module 124*b*. A first terminal of the second power module second switch S22 is electrically coupled to the third terminal of the grid-side power module 124*b*. A second terminal of the second power module second switch S22 is electrically coupled to the second terminal (i.e., the dc bus negative terminal Bus−) of the grid-side power module 124*b*.

A first terminal of the first power module first switch S31 is electrically coupled to the first terminal (i.e., the dc bus positive terminal Bus+) of the load-side power module 144*a*. A second terminal of the first power module first switch S31 is electrically coupled to the third terminal of the load-side power module 144*a*. A first terminal of the first power module second switch S32 is electrically coupled to the third terminal of the load-side power module 144*a*. A second terminal of the first power module second switch S32 is electrically coupled to the second terminal (i.e., the dc bus negative terminal Bus−) of the load-side power module 144*a*.

A first terminal of the second power module first switch S41 is electrically coupled to the first terminal (i.e., the dc bus positive terminal Bus+) of the load-side power module 144*b*. A second terminal of the second power module first switch S41 is electrically coupled to the third terminal of the load-side power module 144*b*. A first terminal of the second power module second switch S42 is electrically coupled to the third terminal of the load-side power module 144*b*. A second terminal of the second power module second switch S42 is electrically coupled to the second terminal (i.e., the dc bus negative terminal Bus−) of the load-side power module 144*b*.

Thus, the first power module switches S11, S12 and the second power module switches S21, S22 of the grid-side power modules 124*a*, 124*b* may receive the same grid-side driving signal CS1 from the grid-side driving circuit 126, and controlled to be on or off such that the grid-side converting device 120 receives the input current Iin from the grid 200 and to supply power to the dc bus via parallel-coupled grid-side power modules 124*a*, 124*b*. the first power module switches S31, S32 and the second power module switches S41, S42 of the load-side power modules 144*a*, 144*b* may receive the same load-side driving signal CS2 from the load-side driving circuit 146, and controlled to be on or off such that the load-side converting device 140 provides the output current Iout to supply power to the load 300 via parallel-coupled load-side power modules 144*a*, 144*b*.

Figure 3A:
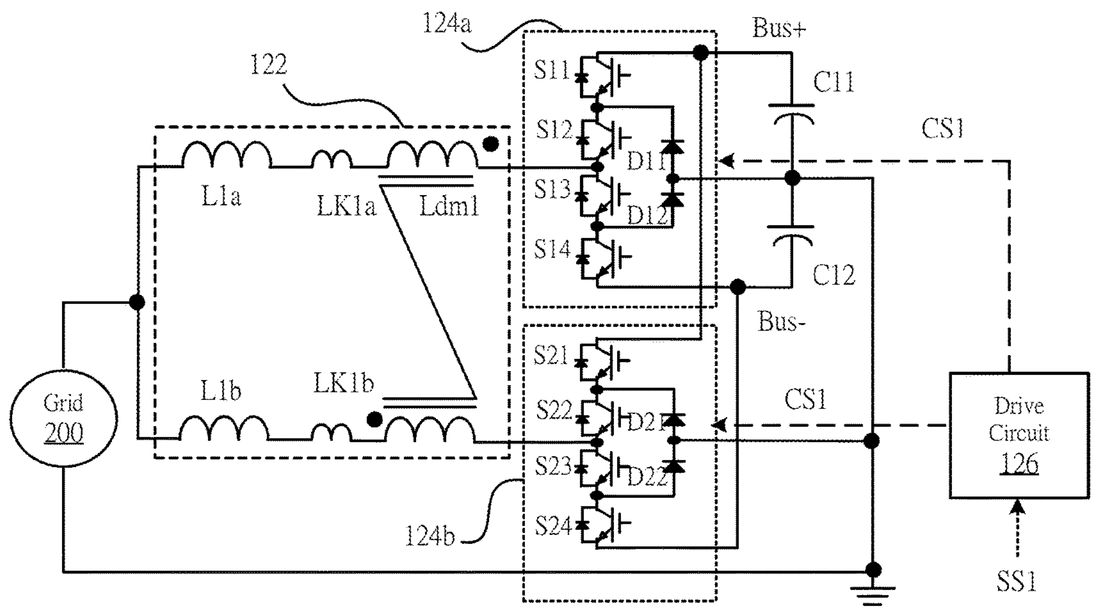
FIG. 3A and FIG. 3B are diagrams illustrating the grid-side converting device and the load-side converting device according to some other embodiments of the present disclosure.
Figure 3B:
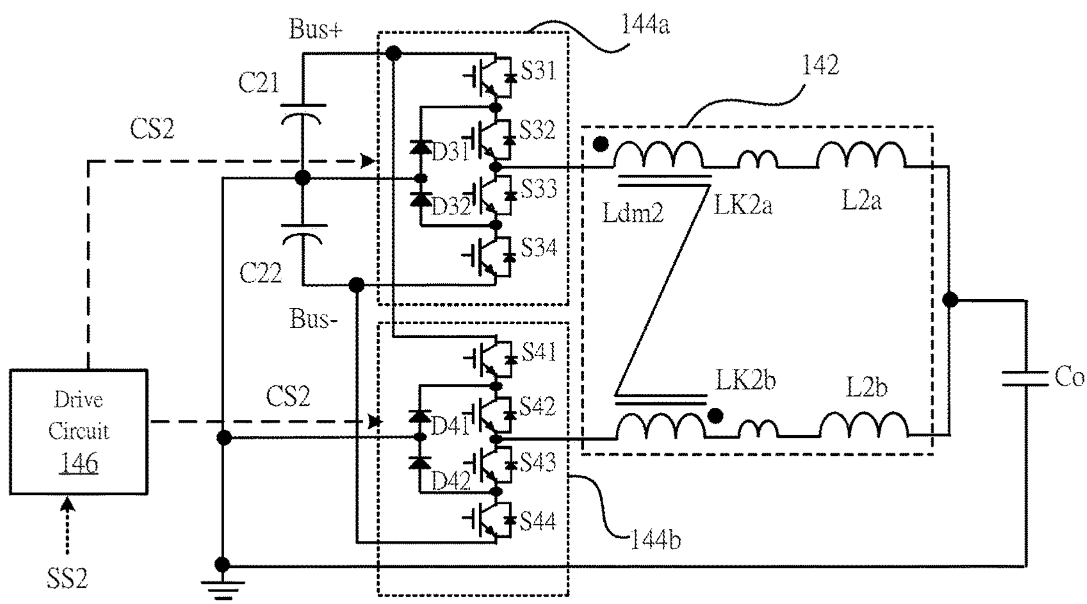

Referring to FIG. 3A and FIG. 3B, in some embodiments, the grid-side power module 124*a* includes a first power module first switch S11, a first power module second switch S12, a first power module third switch S13, a first power module fourth switch S14 and a first power module first diode D11, and a first power module second diode D12. The grid-side power module 124*b* includes a second power module first switch S21, a second power module second switch S22, a second power module third switch S23, a second power module fourth switch S24 and a second power module first diode D21, and a second power module second diode D22. The load-side power module 144*a* includes a power module first switch S31, a power module second switch S32, a power module third switch S33, a power module fourth switch S34 and a power module first diode D31, and a power module second diode D32. The load-side power module 144*b* includes a power module first switch S41, a power module second switch S42, a power module third switch S43, a power module fourth switch S44 and a power module first diode D41, and a power module second diode D42.

Referring to the grid-side power module 124*a*, a first terminal of the first power module first switch S11 is electrically coupled to the first terminal (i.e., the dc bus positive terminal Bus+) of the grid-side power module 124*a*. A second terminal of the first power module first switch S11 is electrically coupled to a first terminal of the first power module second switch S12. A second terminal of the first power module second switch S12 is electrically coupled to a third terminal of the grid-side power module 124*a*. A first terminal of the first power module third switch S13 is electrically coupled to a third terminal of the grid-side power module 124*a*. A second terminal of the first power module third switch S13 is electrically coupled to a first terminal of the first power module fourth switch S14. A second terminal of the first power module fourth switch S14 is electrically coupled to the second terminal (i.e., the dc bus negative terminal Bus−) of the grid-side power module 124a.

A first terminal (e.g., the negative terminal) of the first power module first diode D11 is electrically coupled to the second terminal of the first power module first switch S11. A second terminal (e.g., the positive terminal) of the first power module first diode D11 is electrically coupled to a fourth terminal of the grid-side power module 124a, which is electrically coupled to a neutral point of the dc bus. A first terminal (e.g., the negative terminal) of the first power module second diode D12 is electrically coupled to the second terminal of the first power module first diode D11. A second terminal (e.g., the positive terminal) of the first power module second diode D12 is electrically coupled to the second terminal of the first power module third switch S13.

The electrical connection of the switches S21-S24, S31-S34, S41-S44 and the diodes D21, D22, D31, D32, D41, D42, of the grid-side power module 124b and the load-side power modules 144a, 144b, are of similar arrangement to the first power module switches S11-S14 and the first power module diodes D11, D12 of the grid-side power module 124a, as would be understood by a Person Skilled in the Art, and thus are not repeatedly described herein for sake of brevity.

Alternatively stated, in addition to the 2-level structure power modules shown in FIG. 2, the grid-side converting device 120 and the load-side converting device 140, as shown in FIG. 3A and FIG. 3B, may also be implemented by switch elements and diode elements to realize a 3-level NPC structure grid-side having power modules 124a, 124b and load-side power module 144a, 144b.

Figure 4A:
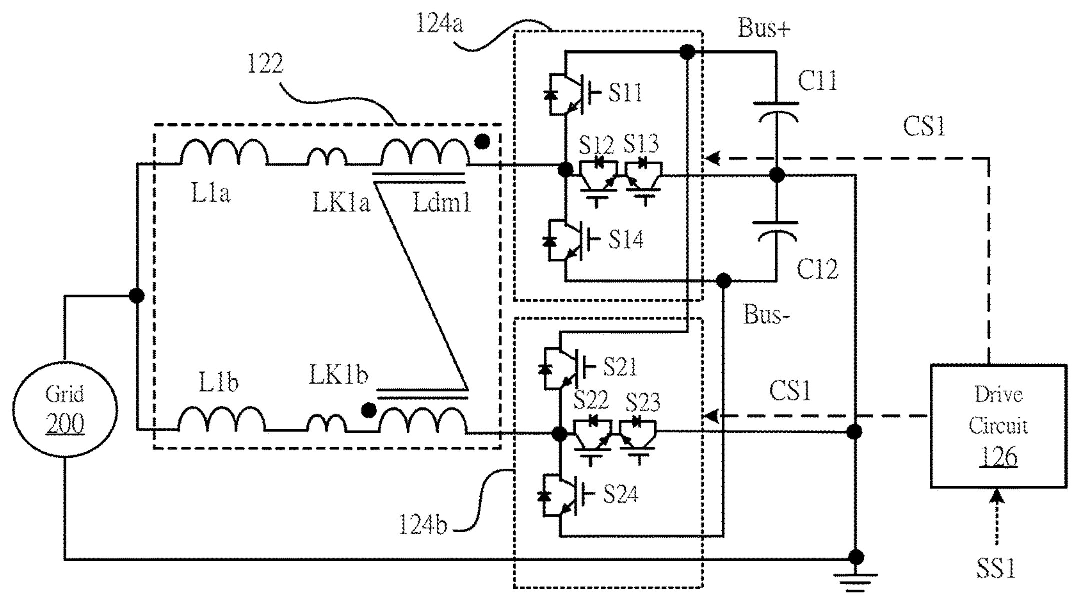
FIG. 4A and FIG. 4B are diagrams illustrating the grid-side converting device and the load-side converting device according to some other embodiments of the present disclosure.
Figure 4B:
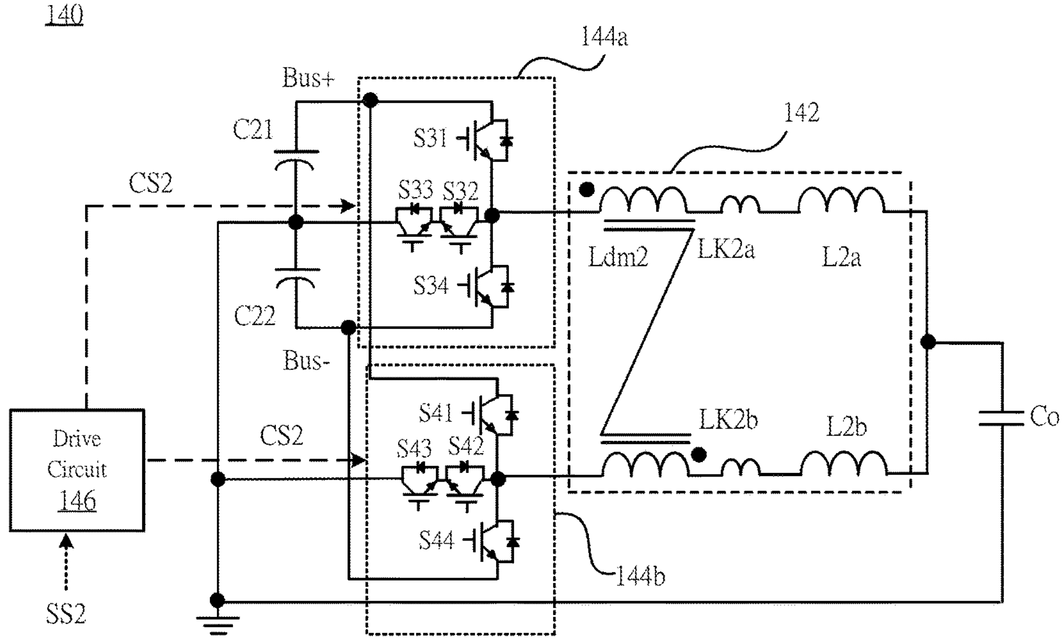

An alternative embodiment of 3-level TNPC structure grid-side power modules 124a, 124b and the load-side power module 144a, 144b is shown in FIG. 4A and FIG. 4B. Referring to the grid-side power module 124a, a first terminal of the first power module first switch S11 is electrically coupled to the first terminal (i.e., the dc bus positive terminal Bus+) of the grid-side power module 124a. A second terminal of the first power module first switch S11 is electrically coupled to the third terminal of the grid-side power module 124a. A first terminal of the first power module second switch S12 is electrically coupled to the third terminal of the grid-side power module 124a. A second terminal of the first power module second switch S12 is electrically coupled to a first terminal of the first power module third switch S13. A second terminal of the first power module third switch S13 is electrically coupled to the fourth terminal of the grid-side power module 124a, which is electrically coupled to a neutral point of the dc bus. A first terminal of the first power module fourth switch S14 is electrically coupled to the third terminal of the grid-side power module 124a. A second terminal of the first power module fourth switch S14 is electrically coupled to the second terminal (i.e., the dc bus negative terminal Bus−) of the grid-side power module 124a.

The arrangement of the switches S21-S24, S31-S34, and S41-S44, of the grid-side power module 124b and the load-side power modules 144a, 144b, are of similar arrangement to the first power module switches S11-S14 of the grid-side power module 124a, as would be understood by a Person Skilled in the Art, and thus are not repeatedly described herein for sake of brevity.

Figure 5A:
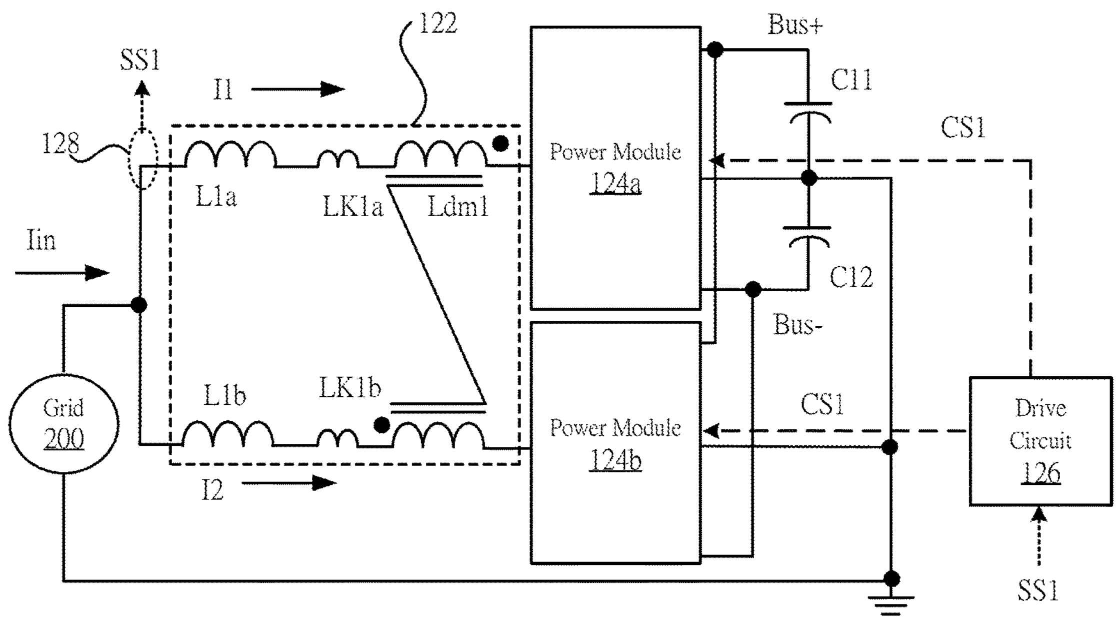
FIG. 5A and FIG. 5B are diagrams illustrating the grid-side converting device and the load-side converting device according to some other embodiments of the present disclosure.

Referring to FIG. 5A, in some embodiments, the current detecting unit 128 may be selectively arranged on the first branch or the second branch, and configured to detect the current I1 flowing through the first winding or the current I2 flowing through the second winding. According to the detected current, the current detecting unit 128 outputs the grid-side current detecting signal SS1 to the grid-side driving circuit 126 to drive the grid-side power modules 124a, 124b according to the grid-side current detecting signal SS1. For example, the current detecting unit 128 may be arranged on the first branch and configured to detect the current I1. By the flux balance in the first winding and the second winding of the coupled differential-mode inductor Ldm1, an auto balance of the current I1 in the first branch and the current I2 in the second branch may be achieved during a steady state of the circuit. Therefore, the current detecting unit 128 may only detect the current (e.g., current I1) on one branch and output corresponding grid-side current detecting signal SS1, and the grid-side driving circuit 126 may accordingly drive the grid-side power modules 124a, 124b to control the amplitude of the input current Iin.

Figure 5B:
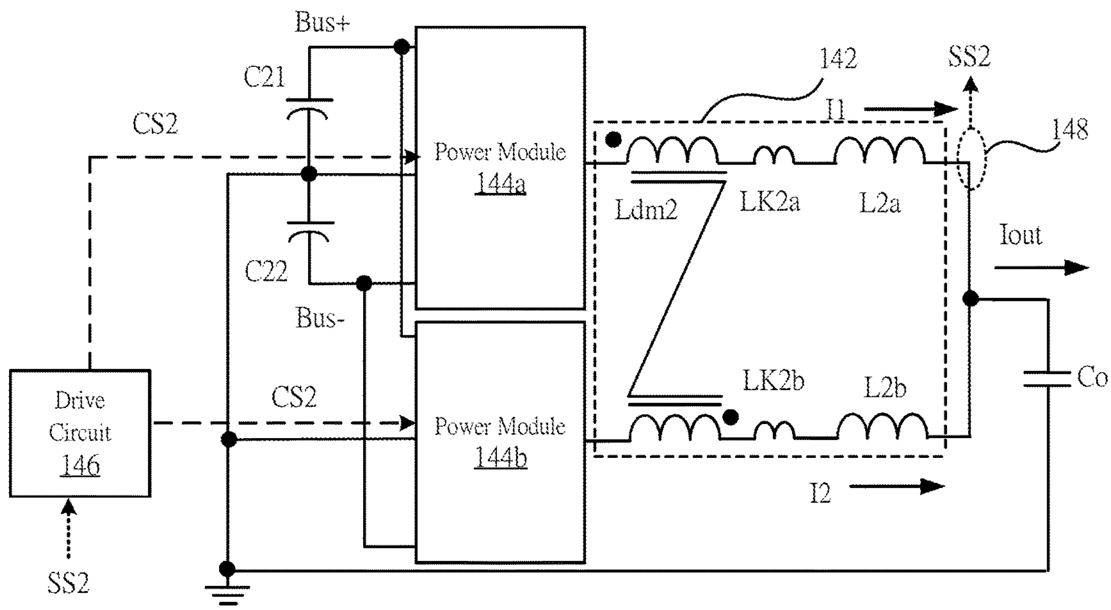

Referring to FIG. 5B, in some embodiments, the current detecting unit 148 in the load-side converting device 140 may be selectively arranged on the first branch or the second branch, and configured to detect the current I3 flowing through the first winding or the current I4 flowing through the second winding. According to the detected current, the current detecting unit 148 outputs the load-side current detecting signal SS2 to the load-side driving circuit 146 to drive the load-side power modules 144a, 144b according to the load-side current detecting signal SS2. The current detecting unit 148 may also only detect the current (e.g., current I3) on one branch and output corresponding load-side current detecting signal SS2. The load-side driving circuit 146 may accordingly drive the load-side power modules 144a, 144b to control the amplitude of the input current Iout. Specific operation have been discussed in detail in the above paragraphs and thus are not repeated herein for the sake of brevity.

In addition, in the embodiment shown in FIG. 2, the first windings of the coupled differential-mode inductor Ldm1 may be electrically coupled to the first terminal of the loop current limiting circuit 122. The second windings of the coupled differential-mode inductor Ldm1 may be electrically coupled to the second terminal of the loop current limiting circuit 122.

The first windings of the coupled differential-mode inductor Ldm2 may be electrically coupled to the first terminal of the loop current limiting circuit 142. The second windings of the coupled differential-mode inductor Ldm2 may be electrically coupled to the second terminal of the loop current limiting circuit 142.

The inductive unit L1a may be electrically coupled to the third terminal of the loop current limiting circuit 122. The inductive unit L1b may be electrically coupled to the fourth terminal of the loop current limiting circuit 122. The inductive unit L2a may be electrically coupled to the third terminal of the loop current limiting circuit 142. The inductive unit L2b may be electrically coupled to the fourth terminal of the loop current limiting circuit 142. However, the present disclosure is not limited thereto.

For example, in some other embodiments, the first windings of the coupled differential-mode inductor Ldm1 may be electrically coupled to the third terminal of the loop current limiting circuit 122, and electrically coupled to the first terminal of the loop current limiting circuit 122 via the inductive unit L1a. The first windings of the coupled differential-mode inductor Ldm2 may be electrically coupled to the third terminal of the loop current limiting circuit 142, and electrically coupled to the first terminal of the loop current limiting circuit 142 via the inductive unit L2a.

The second windings of the coupled differential-mode inductor Ldm1 may be electrically coupled to the fourth terminal of the loop current limiting circuit 122, and electrically coupled to the second terminal of the loop current limiting circuit 122 via the inductive unit L1*b*. The second windings of the coupled differential-mode inductors Ldm2 may be electrically coupled to the fourth terminal of the loop current limiting circuit 142, and electrically coupled to the second terminal of the loop current limiting circuit 142 via the inductive unit L2*b*.

Alternatively stated, it is envisaged that the inductive units L1*a*, L1*b* in the loop current limiting circuit 122 may be arranged selectively before or after the coupled differential-mode inductor Ldm1 to reduce the steady state loop current and variance of the current during transient. The inductive units L2*a*, L2*b* in the loop current limiting circuit 142 may be arranged selectively before or after the coupled differential-mode inductors Ldm2 to reduce the steady state loop current and variance of the current during transient.

Figure 6A:
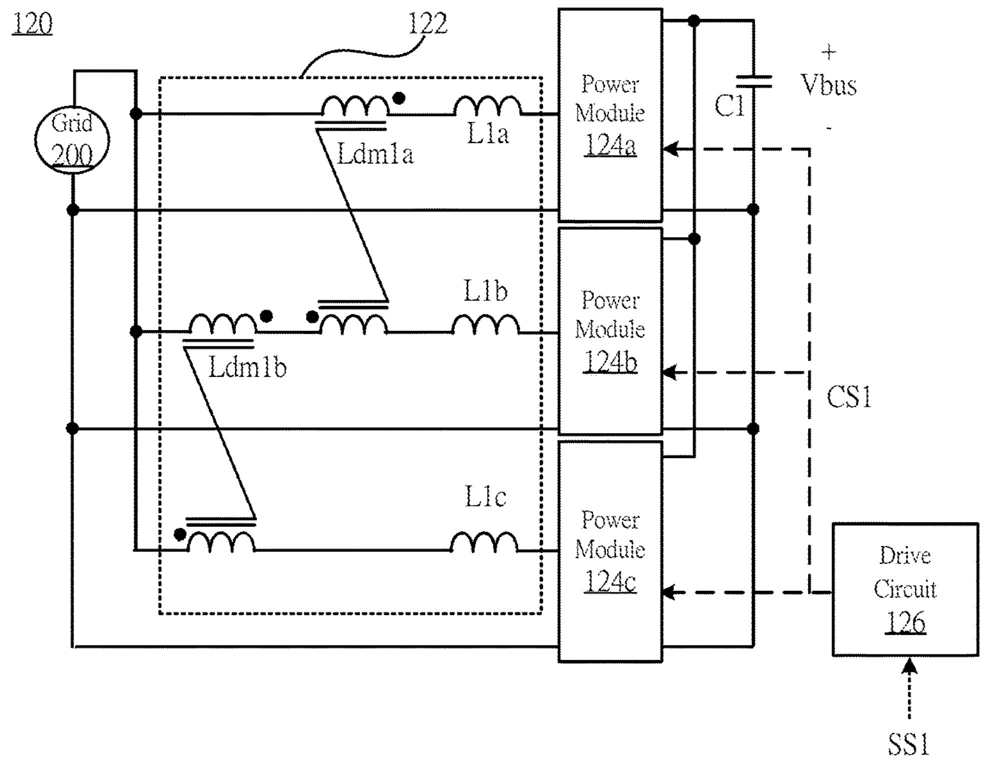
FIG. 6A and FIG. 6B are diagrams illustrating the grid-side converting device and the load-side converting device according to some other embodiments of the present disclosure.
Figure 6B:
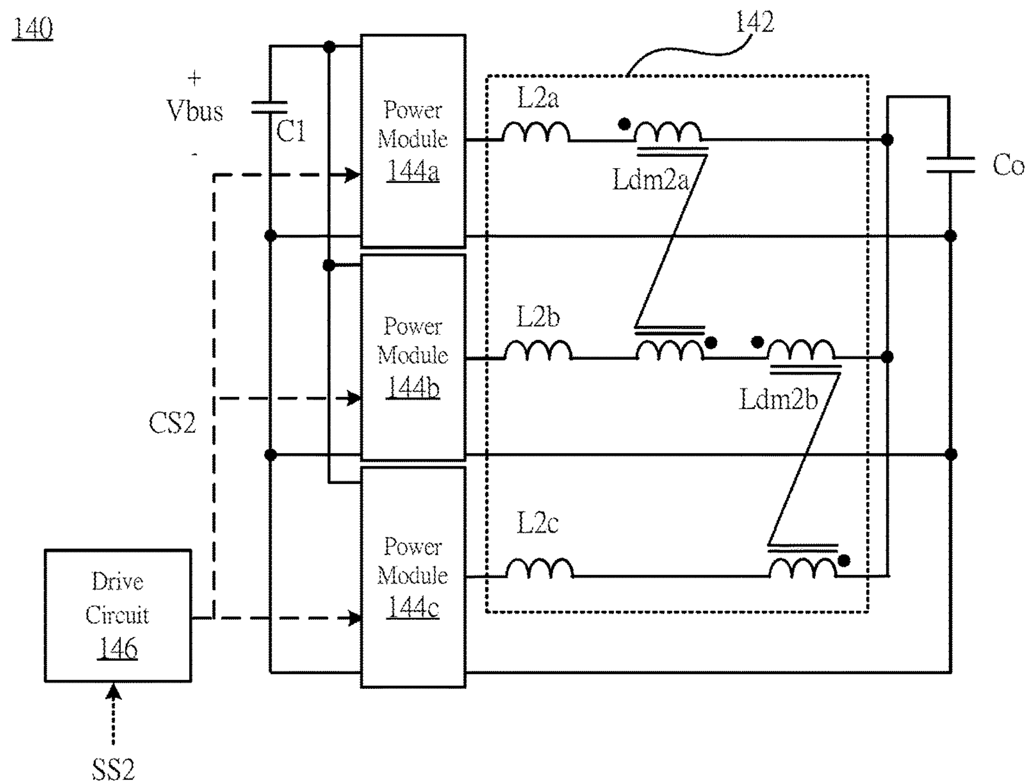

Referring to FIG. 6A and FIG. 6B, in some embodiments, the grid-side converting device 120 may include three or more sets of grid-side power modules 124*a*, 124*b*, 124*c* electrically coupled in parallel, and the load-side converting device 140 may include load-side power modules 144*a*, 144*b*, 144*c* electrically coupled in parallel. Compared to the embodiment shown in FIG. 2, in the present embodiment, the grid-side converting device 120 further includes the grid-side power module 124*c*, which is electrically coupled to the grid-side power modules 124*a* in parallel. The grid-side driving circuit 126 is further configured to output the grid-side driving signal CS1 to the grid-side power modules 124*a*, 124*b*, and 124*c* according to the current detecting signal SS1. Similarly, the load-side converting device 140 further includes the load-side power module 144*c*, which is electrically coupled to the load-side power modules 144*a* in parallel. The load-side driving circuit 146 is further configured to output the load-side driving signal CS2 to the load-side power modules 144*a*, 144*b*, and 144*c* according to the current detecting signal SS2.

As shown in FIG. 6A, in the present embodiments, the grid-side loop current limiting circuit 122 in the grid-side converting device 120 further includes a fifth terminal and a sixth terminal, in which the fifth terminal is electrically coupled to the grid-side power module 124*c*, and the sixth terminal is electrically coupled to the third terminal and the fourth terminal of the grid-side loop current limiting circuit 122. Thus, the grid-side loop current limiting circuit 122 may be electrically coupled between the grid 200 and three set of the grid-side power module 124*a*, 124*b*, and 124*c* to achieve auto balance between three branches. Specifically, in the present embodiment, the grid-side loop current limiting circuit 122 includes inductive units L1*a*, L1*b*, L1*c* and the coupled differential-mode inductors Ldm1*a*, Ldm1*b*. The coupled differential-mode inductor Ldm1*a* includes a first winding and a second winding respectively electrically coupled to the grid-side power modules 124*a*, 124*b* via the inductive units L1*a*, L1*b*. Similarly, the coupled differential-mode inductor Ldm1*b* includes a third winding and a fourth winding respectively electrically coupled to the grid-side power modules 124*b*, 124*c* via the inductive units L1*b*, L1*c*, in which the inductive unit L1*c* is electrically coupled to the fourth winding.

Accordingly, by the flux balance of the first winding and the second winding of the coupled differential-mode inductors Ldm1*a*, and the flux balance of the third winding and the fourth winding of the coupled differential-mode inductors Ldm1*b*, the auto balance of the current in the three branches in the grid-side converting device 120 may be achieved.

Similarly, as shown in FIG. 6B, the load-side loop current limiting circuit 142 in the load-side converting device 140 also further includes a fifth terminal and a sixth terminal, in which the fifth terminal is electrically coupled to the load-side power module 144*c*, and the sixth terminal is electrically coupled to the third terminal and the fourth terminal of the load-side loop current limiting circuit 142. Thus, the load-side loop current limiting circuit 142 may be electrically coupled between the load 300 and three set of the load-side power module 144*a*, 144*b*, and 144*c* to achieve the auto balance between three branches. Specifically, in the present embodiment, the load-side loop current limiting circuit 142 includes inductive units L2*a*, L2*b*, L2*c* and the coupled differential-mode inductors Ldm2*a*, Ldm2*b*. The coupled differential-mode inductor Ldm2*a* includes a first winding and a second winding respectively electrically coupled to the load-side power modules 144*a*, 144*b* via the inductive units L2*a*, L2*b*. Similarly, the coupled differential-mode inductor Ldm2*b* includes a third winding and a fourth winding respectively electrically coupled to the load-side power modules 144*b*, 144*c* via the inductive units L2*b*, L2*c*, in which the inductive unit L2*c* is electrically coupled to the fourth winding.

Accordingly, by the flux balance of the first winding and the second winding of the coupled differential-mode inductors Ldm2*a*, and the flux balance of the third winding and the fourth winding of the coupled differential-mode inductors Ldm2*b*, the auto balance of the current in the three branches in the load-side converting device 140 may be achieved.

Alternatively stated, by arranging the coupled differential-mode inductor on the input or output branches of the adjacent power modules, the flux balance between the branches may be achieved. Thus, the grid-side converting device 120 and the load-side converting device 140 may transmit power via multiple power modules respectively, so as to prevent damage to the system elements resulting from loop current occurring between branches, while meeting the capacity requirement of the backup power supply system 100.

Figure 7:
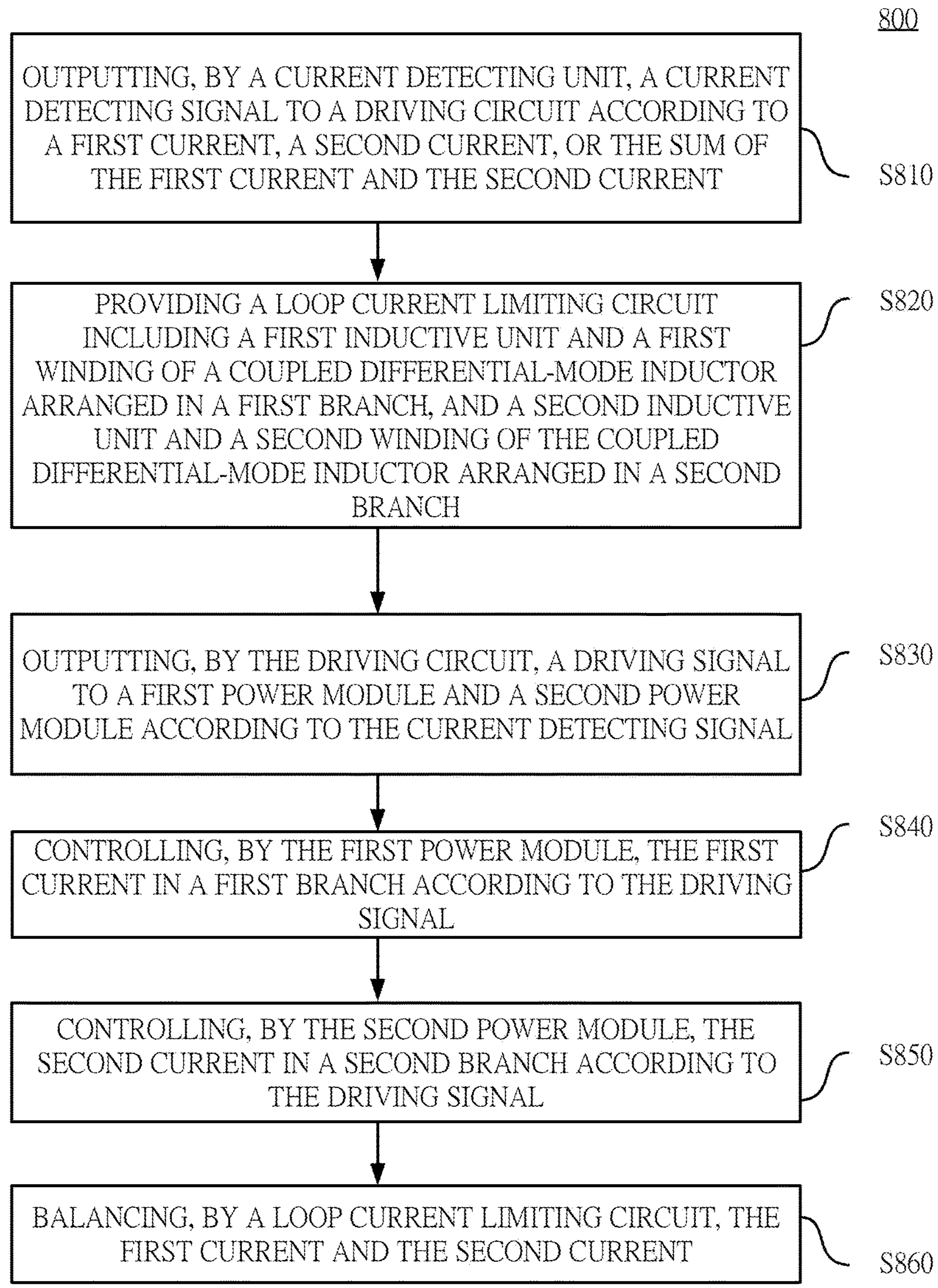
FIG. 7 is a flowchart illustrating a control method according to some embodiments of the present disclosure.

Referring to FIG. 7, for better understanding of the present disclosure, a control method 800 is discussed in relation to the embodiments shown in FIG. 1-FIG. 6A and FIG. 6B, but it is not limited thereto. As shown, the control method 800 includes steps S810, S820, S830, S840, S850 and S860.

In some embodiments, the method is applied at the grid-side. In step S810, the grid-side current detecting signal SS1 is output by the grid-side current detecting unit 128, to the grid-side driving circuit 126 according to the current I1, the current I2, or the sum of the current I1 and the current I2.

Next, in step S820, the loop current limiting circuit 122 including the first inductive unit L1*a* and the first winding of the coupled differential-mode inductor Ldm1 arranged in the first branch, and the second inductive unit L1*b* and the second winding of the coupled differential-mode inductor Ldm1 arranged in the second branch is provided.

Next, in step S830, a grid-side driving signal CS1 is output by the grid-side driving circuit 126 to the grid-side power module 124*a* and the grid-side power module 124*b* according to the grid-side current detecting signal SS1, in which the grid-side power module 124*a* and the grid-side power module 124*b* are electrically coupled to each other in parallel.

Next, in step S840, the current I1 in a first branch is controlled by the grid-side power module 124*a* according to the grid-side driving signal CS1. Specifically in some embodiments, the step S830 further includes receiving, by the grid-side power module 124*a*, the current I1 via the first branch from the grid 200, according to the grid-side driving signal CS1, in order to supply power to the dc bus.

In step S850, the current I2 in a second branch is controlled by the grid-side power module 124*b* according to the grid-side driving signal CS1. Specifically in some embodiments, the step S840 further includes receiving, by the grid-side power module 124*b*, the current I2 via the second branch from the grid 200, according to the grid-side driving signal CS1, in order to supply power to the dc bus.

Next, in step S860, the current I1 and the current I2 are balanced by the grid-side loop current limiting circuit 122. Specifically in some embodiments, the inductive unit L1*a* and the first winding of the coupled differential-mode inductor Ldm1 in the grid-side loop current limiting circuit 122 are arranged in the first branch. The inductive unit L1*b* and the second winding of the coupled differential-mode inductor Ldm1 in the grid-side loop current limiting circuit 122 are arranged in the second branch. Thus, the grid-side loop current limiting circuit 122 achieves the auto balance of the current I1 and current I2 by the flux balance of the first winding and the second winding of the coupled differential-mode inductor Ldm1.

In some other embodiments, the method is applied at the load-side. In step S810, the load-side current detecting signal SS2 is output by the load-side current detecting unit 148, to the load-side driving circuit 146 according to the current I3, the current I4, or the sum of the current I3 and the current I4.

Next, in step S820, the loop current limiting circuit 142 including the first inductive unit L2*a* and the first winding of the coupled differential-mode inductor Ldm2 arranged in the first branch, and the second inductive unit L2*b* and the second winding of the coupled differential-mode inductor Ldm2 arranged in the second branch is provided.

Next, in step S830, the load-side driving signal CS2 is output by the load-side driving circuit 146 to the load-side power module 144*a* and the load-side power module 144*b* according to the load-side current detecting signal SS2, in which the load-side power module 144*a* and the load-side power module 144*b* are electrically coupled to each other in parallel.

Next, in step S840, the current I3 in a first branch is controlled by the load-side power module 144*a* according to the load-side driving signal CS2. Specifically in some embodiments, the step S830 further includes receiving, by the load-side power module 144*a*, the current I3 via the first branch from the dc bus, according to the load-side driving signal CS2, in order to supply power to the load 300.

In step S850, the current I4 in a second branch is controlled by the load-side power module 144*b* according to the load-side driving signal CS2. Specifically in some embodiments, the step S840 further includes receiving, by the load-side power module 144*b*, the current I4 via the second branch from the dc bus, according to the load-side driving signal CS2, in order to supply power to the load 300.

Next, in step S860, the current I3 and the current I4 are balanced by the load-side loop current limiting circuit 142. Specifically in some embodiments, the inductive unit L2*a* and the first winding of the coupled differential-mode inductor Ldm2 in the load-side loop current limiting circuit 142 are arranged in the first branch. The inductive unit L2*b* and the second winding of the coupled differential-mode inductor Ldm2 in the load-side loop current limiting circuit 142 are arranged in the second branch. Thus, the load-side loop current limiting circuit 142 achieves the auto balance of the current I3 and current I4 by the flux balance of the first winding and the second winding of the coupled differential-mode inductor Ldm2.

In the various embodiments of the present disclosure, the control method 800 may be applied in the grid-side converting device 120 and/or the load-side converting device 140, such that the grid-side converting device 120 and the load-side converting device 140 may transmit power via multiple power modules, and avoid loop current occurred between the current branches which may cause damage to the system elements.

What is claimed is:

1. A power converting device comprising:
- a first power module and a second power module, wherein the first power module and the second power module are electrically coupled in parallel;
- a loop current limiting circuit, wherein a first terminal and a second terminal of the loop current limiting circuit are coupled to the first power module and the second power module respectively, a third terminal and a fourth terminal of the loop current limiting circuit are coupled to each other, and the loop current limiting circuit comprises:
  - a coupled differential-mode inductor, comprising a first winding and a second winding, wherein the first winding is electrically coupled to the first power module, and the second winding is electrically coupled to the second power module;
  - a first inductive unit coupled to the first winding; and
  - a second inductive unit coupled to the second winding; and
- a driving circuit configured to output a driving signal to the first power module and the second power module according to a current detecting signal.

2. The power converting device of claim 1, wherein a first terminal of the first power module and a first terminal of the second power module are electrically coupled to a dc bus positive terminal, a second terminal of the first power module and a second terminal of the second power module are electrically coupled to a dc bus negative terminal, a third terminal of the first power module and a third terminal of the second power module are electrically coupled to the first winding and the second winding respectively, and wherein the first power module and the second power module are driven according to the same driving signal.

3. The power converting device of claim 2, wherein the third terminal and the fourth terminal of the loop current limiting circuit are electrically coupled to a grid, wherein the first power module and the second power module are respectively configured to receive a first current and a second current from the grid via the loop current limiting circuit according to the driving signal, and wherein the first power module and the second power module are configured to supply power to the dc bus.

4. The power converting device of claim 3, further comprising a current detecting unit configured to detect the first current or the second current, and correspondingly output the current detecting signal to the driving circuit, wherein the driving circuit drives the first power module and the second power module according to the current detecting signal.

5. The power converting device of claim 3, further comprising a current detecting unit configured to detect an input current of the grid and correspondingly output the current detecting signal to the driving circuit to drive the first power module and the second power module, wherein the input current is a sum of the first current and the second current.

6. The power converting device of claim 2, wherein the third terminal and the fourth terminal of the loop current limiting circuit are electrically coupled to a load via the loop current limiting circuit, wherein the first power module and the second power module are respectively configured to output a third current and a fourth current according to the driving signal, and wherein the third current and the fourth current are configured to supply power to the load.

7. The power converting device of claim 6, further comprising a current detecting unit configured to detect the third current or the fourth current, and correspondingly output the current detecting signal to the driving circuit, wherein the driving circuit drives the first power module and the second power module according to the current detecting signal.

8. The power converting device of claim 6, further comprising a current detecting unit configured to detect an output current provided by the power converting device to the load, and correspondingly output the current detecting signal to the driving circuit to drive the first power module and the second power module, wherein the output current is a sum of the third current and the fourth current.

9. The power converting device of claim 2, wherein the first winding is electrically coupled to the third terminal of the loop current limiting circuit, and electrically coupled to the first terminal of the loop current limiting circuit via the first inductive unit; and wherein the second winding is electrically coupled to the fourth terminal of the loop current limiting circuit, and electrically coupled to the second terminal of the loop current limiting circuit via the second inductive unit.

10. The power converting device of claim 2, wherein the first winding is electrically coupled to the first terminal of the loop current limiting circuit; the second winding is electrically coupled to the second terminal of the loop current limiting circuit; the first inductive unit is electrically coupled to the third terminal of the loop current limiting circuit; and the second inductive unit is electrically coupled to the fourth terminal of the loop current limiting circuit.

11. The power converting device of claim 2, wherein the first power module comprises:

a first power module first switch, wherein a first terminal of the first power module first switch is electrically coupled to the first terminal of the first power module, and a second terminal of the first power module first switch is electrically coupled to the third terminal of the first power module; and a first power module second switch, wherein a first terminal of the first power module second switch is electrically coupled to the third terminal of the first power module, and a second terminal of the first power module second switch is electrically coupled to the second terminal of the first power module, and wherein the second power module comprises:

a second power module first switch, wherein a first terminal of the second power module first switch is electrically coupled to the first terminal of the second power module, and a second terminal of the second power module first switch is electrically coupled to the third terminal of the second power module; and a second power module second switch, wherein a first terminal of the second power module second switch is electrically coupled to the third terminal of the second power module, and a second terminal of the second power module second switch is electrically coupled to the second terminal of the second power module.

12. The power converting device of claim 2, wherein the first power module comprises:

a first power module first switch, wherein a first terminal of the first power module first switch is electrically coupled to the first terminal of the first power module;

a first power module second switch, wherein a first terminal of the first power module second switch is electrically coupled to a second terminal of the first power module first switch, and a second terminal of the first power module second switch is electrically coupled to the third terminal of the first power module;

a first power module third switch, wherein a first terminal of the first power module third switch is electrically coupled to the third terminal of the first power module;

a first power module fourth switch, wherein a first terminal of the first power module fourth switch is electrically coupled to a second terminal of the first power module third switch, and a second terminal of the first power module fourth switch is electrically coupled to the second terminal of the first power module;

a first power module first diode, wherein a first terminal of the first power module first diode is electrically coupled to the second terminal of the first power module first switch, and a second terminal of the first power module first diode is electrically coupled to a fourth terminal of the first power module; and a first power module second diode, wherein a first terminal of the first power module second diode is electrically coupled to the second terminal of the first power module first diode, and a second terminal of the first power module second diode is electrically coupled to the second terminal of the first power module third switch;

and wherein the second power module comprises:

a second power module first switch, wherein a first terminal of the second power module first switch is electrically coupled to the first terminal of the second power module;

a second power module second switch, wherein a first terminal of the second power module second switch is electrically coupled to a second terminal of the second power module first switch, and a second terminal of the second power module second switch is electrically coupled to the third terminal of the second power module;

a second power module third switch, wherein a first terminal of the second power module third switch is electrically coupled to the third terminal of the second power module;

a second power module fourth switch, wherein a first terminal of the second power module fourth switch is electrically coupled to a second terminal of the second power module third switch, and a second terminal of the second power module fourth switch is electrically coupled to the second terminal of the second power module;

a second power module first diode, wherein a first terminal of the second power module first diode is electrically coupled to the second terminal of the second power module first switch, and a second terminal of the second power module first diode is electrically coupled to a fourth terminal of the second power module; and a second power module second diode, wherein a first terminal of the second power module second diode is electrically coupled to the second terminal of the second power module first diode, and a second terminal of the second power module second diode is electrically coupled to the second terminal of the second power module third switch;

wherein the fourth terminal of the first power module and the fourth terminal of the second power module are electrically coupled to a neutral point of the dc bus.

13. The power converting device of claim 2, wherein the first power module comprises:

a first power module first switch, wherein a first terminal of the first power module first switch is electrically coupled to the first terminal of the first power module, and a second terminal of the first power module first switch is electrically coupled to the third terminal of the first power module;

a first power module second switch, wherein a first terminal of the first power module second switch is electrically coupled to the third terminal of the first power module; and a first power module third switch, wherein a first terminal of the first power module third switch is electrically coupled to a second terminal of the first power module second switch, and a second terminal of the first power module third switch is electrically coupled to a fourth terminal of the first power module;

a first power module fourth switch, wherein a first terminal of the first power module fourth switch is electrically coupled to the third terminal of the first power module, and a second terminal of the first power module fourth switch is electrically coupled to the second terminal of the first power module;

and wherein the second power module comprises:

a second power module first switch, wherein a first terminal of the second power module first switch is electrically coupled to the first terminal of the second power module, and a second terminal of the second power module first switch is electrically coupled to the third terminal of the second power module;

a second power module second switch, wherein a first terminal of the second power module second switch is electrically coupled to the third terminal of the second power module; and a second power module third switch, wherein a first terminal of the second power module third switch is electrically coupled to a second terminal of the second power module second switch, and a second terminal of the second power module third switch is electrically coupled to a fourth terminal of the second power module;

a second power module fourth switch, wherein a first terminal of the second power module fourth switch is electrically coupled to the third terminal of the second power module, and a second terminal of the second power module fourth switch is electrically coupled to the second terminal of the second power module;

wherein the fourth terminal of the first power module and the fourth terminal of the second power module are electrically coupled to a neutral point of the dc bus.

14. The power converting device of claim 1, further comprising:

a third power module electrically coupled to the first power module in parallel, wherein a fifth terminal of the loop current limiting circuit is electrically coupled to the third power module, and a sixth terminal of the loop current limiting circuit is electrically coupled to the third terminal of the loop current limiting circuit, wherein the loop current limiting circuit further comprises:

a second coupled differential-mode inductor, comprising a third winding and a fourth winding, wherein the third winding is electrically coupled to the second power module, and the fourth winding is electrically coupled to the third power module; and a third inductive unit electrically coupled to the fourth winding, and wherein the driving circuit is further configured to output the driving signal to the third power module according to the current detecting signal.

15. A power supply system, comprising:

a grid-side converting device configured to receive an input current from a grid and supply power to a dc bus; and a load-side converting device configured to receive power from the dc bus and output an output current and supply power to a load;

wherein the grid-side converting device comprises:

a first grid-side power module and a second grid-side power module, wherein the first grid-side power module and the second grid-side power module are electrically coupled in parallel to the dc bus and configured to receive a first input current and a second input current from the grid;

a grid-side loop current limiting circuit, wherein a first terminal and a second terminal of the grid-side loop current limiting circuit are coupled to the first grid-side power module and the second grid-side power module respectively, a third terminal and a fourth terminal of the grid-side loop current limiting circuit are coupled to each other, and the grid-side loop current limiting circuit comprises:

a coupled differential-mode inductor, comprising a first winding and a second winding, wherein the first winding is electrically coupled to the first grid-side power module, and the second winding is electrically coupled to the second grid-side power module;

a first inductive unit coupled to the first winding; and a second inductive unit coupled to the second winding; and a grid-side driving circuit configured to output a grid-side driving signal to the first grid-side power module and the second grid-side power module according to a grid-side current detecting signal, to control the amplitude of the first input current and the second input current.

16. The power supply system of claim 15, wherein the load-side converting device comprises:

a first load-side power module and a second load-side power module, wherein the first load-side power module and the second load-side power module are electrically coupled in parallel to the dc bus and configured to output a first output current and a second output current to the load;

a load-side loop current limiting circuit, wherein a first terminal and a second terminal of the load-side loop current limiting circuit are coupled to the first load-side power module and the second load-side power module respectively, a third terminal and a fourth terminal of the load-side loop current limiting circuit are coupled to each other, and the load-side loop current limiting circuit comprises:

a second coupled differential-mode inductor, comprising a third winding and a fourth winding, wherein the third winding is electrically coupled to the first load-side power module, and the fourth winding is electrically coupled to the second load-side power module;

a third inductive unit coupled to the third winding; and a fourth inductive unit coupled to the fourth winding; and a load-side driving circuit configured to output a load-side driving signal to the first load-side power module and the second load-side power module according to a load-side current detecting signal, to control the amplitude of the first output current and the second output current.

17. The power supply system of claim 15, wherein a first terminal of the first grid-side power module and a first terminal of the second grid-side power module are electrically coupled to a dc bus positive terminal, wherein a second terminal of the first grid-side power module and a second terminal of the second grid-side power module are electrically coupled to a dc bus negative terminal, wherein a third terminal of the first grid-side power module and a third terminal of the second grid-side power module are electrically coupled to the first winding and the second winding respectively, and wherein the first grid-side power module and the second grid-side power module are driven according to the same grid-side driving signal.

18. A control method, comprising:

outputting, by a driving circuit, a driving signal to a first power module and a second power module according to a current detecting signal, wherein the first power module and the second power module are electrically coupled to each other in parallel;

providing a loop current limiting circuit comprising a first inductive unit and a first winding of a coupled differential-mode inductor arranged in a first branch, the loop current limiting circuit further comprising a second inductive unit and a second winding of the coupled differential-mode inductor arranged in a second branch;

controlling, by the first power module, a first current in the first branch according to the driving signal;

controlling, by the second power module, a second current in the second branch according to the driving signal; and balancing, by the loop current limiting circuit, the first current and the second current.

19. The control method of claim 18, further comprising:

outputting, by a current detecting unit, the current detecting signal to the driving circuit according to the first current, the second current, or the sum of the first current and the second current;

receiving, by the first power module, the first current via the first branch from a grid according to the driving signal;

receiving, by the second power module, the second current via the second branch from the grid according to the driving signal; and supplying power to the dc bus, by the first power module and the second power module.

20. The control method of claim 18, further comprising:

outputting, by a current detecting unit, the current detecting signal to the driving circuit according to the first current, the second current, or the sum of the first current and the second current;

receiving, by the first power module, the first current via the first branch from a dc bus according to the driving signal;

receiving, by the second power module, the second current via the second branch from the dc bus according to the driving signal; and supplying power to the load, by the first power module and the second power module.

* * * * *